United States Patent
Shimamura et al.

(10) Patent No.: US 10,579,031 B2
(45) Date of Patent: Mar. 3, 2020

(54) CONTROLLER

(71) Applicant: OMRON Corporation, Kyoto-shi, Kyoto (JP)

(72) Inventors: Tomonori Shimamura, Ohtsu (JP); Tetsushi Jakunen, Kusatu (JP); Koji Yaoita, Kyoto (JP); Tatsuya Kojima, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 250 days.

(21) Appl. No.: 14/951,620

(22) Filed: Nov. 25, 2015

(65) Prior Publication Data
US 2016/0291556 A1   Oct. 6, 2016

(30) Foreign Application Priority Data
Mar. 31, 2015   (JP) ................. 2015-074631

(51) Int. Cl.
  *G05B 19/042*   (2006.01)
  *G06F 9/48*   (2006.01)
  (Continued)

(52) U.S. Cl.
  CPC .......... *G05B 19/042* (2013.01); *G05B 19/05* (2013.01); *G06F 9/4887* (2013.01); *G06F 9/544* (2013.01); *G05B 2219/25482* (2013.01)

(58) Field of Classification Search
CPC ... G06F 9/544; G06F 9/4887; G05B 19/0426; G05B 19/0421; G05B 19/05; G05B 19/042; G05B 2219/25482
See application file for complete search history.

(56) References Cited

U.S. PATENT DOCUMENTS 6,377,012 B1   4/2002   Takaki
2012/0239172 A1*  9/2012   Nishiyama ............. G05B 19/05
                                                          700/86
(Continued)

FOREIGN PATENT DOCUMENTS

CN        1299476 A      6/2001
CN      102870053 A      1/2013
(Continued)

OTHER PUBLICATIONS

Silberschatz A et al, "Operating System Concepts, Passage", Operating System Concepts, XX, XX, (Jan. 1, 1994), XP002272994, pp. 1-3, 97-116, 163-181, 659-671, cited in the EP Search Report dated Sep. 22, 2016 in the counterpart EP patent application.
(Continued)

*Primary Examiner* — Charles E Anya
(74) *Attorney, Agent, or Firm* — Metrolex IP Law Group, PLLC

(57) ABSTRACT

A controller allows easy synchronization between a plurality of control programs executed in parallel to control a plurality of motors. The control programs are executed cyclically in parallel in predetermined execution cycles. Timing data for synchronizing the execution timing of the control programs is transmitted and received between the control programs. After control program 1 is executed, an axis variable to be referred to by the control program 2 is copied from an execution area of the memory for the control program 1 into a buffer area for the control program 2.

3 Claims, 10 Drawing Sheets

(51) Int. Cl.
*G05B 19/05* (2006.01)
*G06F 9/54* (2006.01)

(56) References Cited

U.S. PATENT DOCUMENTS

| 2014/0005805 A1 | 1/2014 | Nishiyama et al. |
| 2014/0012402 A1* | 1/2014 | Nishiyama ............. G05B 19/05 700/86 |
| 2014/0207254 A1 | 7/2014 | Nishiyama et al. |

FOREIGN PATENT DOCUMENTS

| CN | 103403633 A | 11/2013 |
| CN | 103403684 A | 11/2013 |
| CN | 103562807 A | 2/2014 |
| EP | 2672384 A1 | 12/2013 |
| EP | 2711798 A1 | 3/2014 |
| JP | 2003-111151 A | 4/2003 |
| JP | 4752984 B1 | 8/2011 |
| JP | 2012-194666 A | 10/2012 |

OTHER PUBLICATIONS

The Japanese Office Action (JPOA) dated Jun. 5, 2018 in a counterpart Japanese patent application.
The Chinese Office Action (CNOA) dated Apr. 2, 2018 in a counterpart Chinese patent application.

* cited by examiner

FIG. 6

| Unit location | Unit | Control program |
|---|---|---|
|  | ▽ Network setting |  |
| Master | Master |  |
| NODE1 | R88D-KN01H-EC | Control program 1 ▽ |
| NODE2 | R88D-KN01H-EC | Control program 1 ▽ |
| NODE3 | R88D-KN01H-EC | Control program 1 ▽ |
| NODE4 | R88D-KN01H-EC | Control program 2 ▽ |
| NODE5 | R88D-KN01H-EC | Control program 2 ▽ |

FIG. 8
Physical configuration
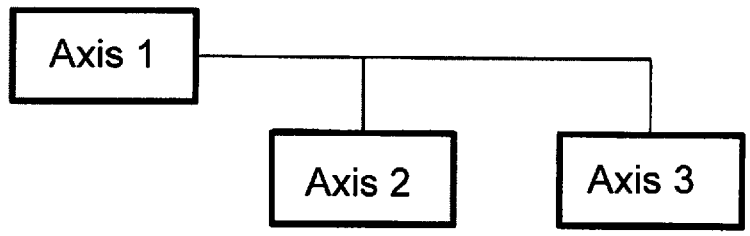
Program configuration
Control program 1
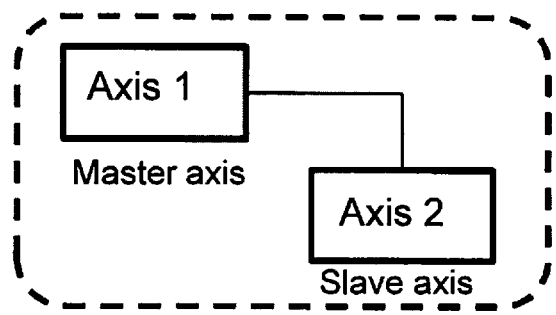
Control program 2
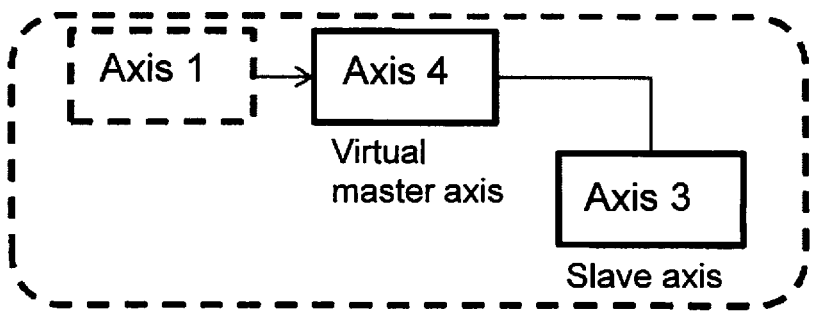

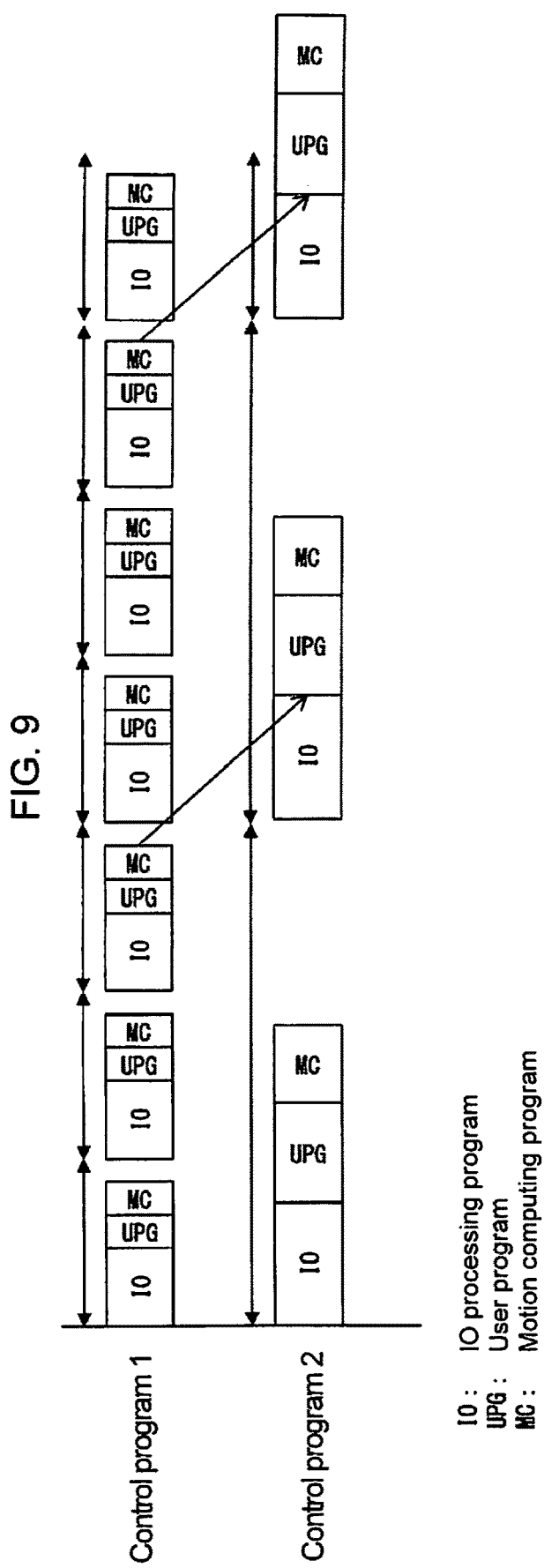

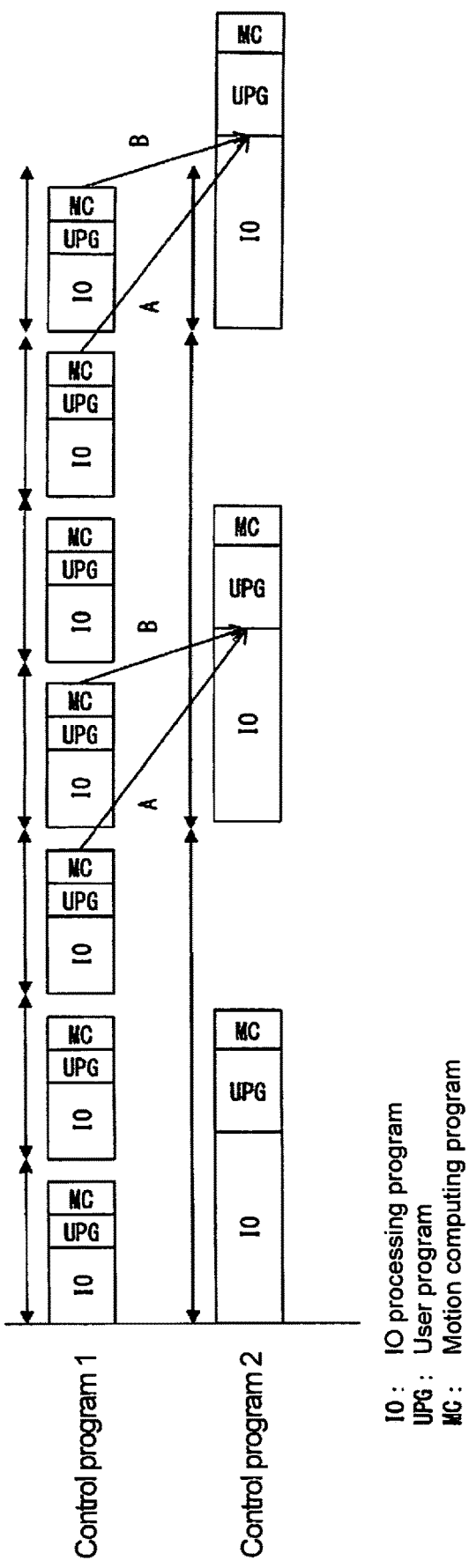

CONTROLLER

FIELD

The present invention relates a controller for controlling the operations of machines or devices, and more particularly, to a controller that allows synchronization of data between a plurality of control programs executed in parallel to control a plurality of motors using a multi-core processor.

BACKGROUND

The operations of machines or devices may be controlled by motion control for controlling the movements of motors. Such motion control may be performed typically by a programmable controller that can use a single central processing unit (CPU) to implement motion computing programs for cyclically outputting command values to motor drivers for driving motors, and to implement sequence computing.

For example, Patent Literature 1 describes a programmable controller that can execute motion computing programs for cyclically outputting command values to motor drivers for driving motors.

The controller described in Patent Literature 1 includes a first control program (short-cycle motion program) including a first motion computing program, which is executed in a first control cycle, and a second control program including a second motion computing program (long-cycle motion program). The second control program is executed in a cycle that is an integral multiple of the first control cycle to output command values to motors. The second control program is executed after the execution of the first control program completes.

When the second control program is incomplete within the predetermined control cycle, an unprocessed portion of the second control program is executed in the subsequent control cycle of the first control program after completion of the first control program.

CITATION LIST

Patent Literature

Patent Literature 1: Japanese Patent No. 4752984

SUMMARY

Technical Problem

An apparatus that controls motors using the above controller may need to shorten the time for computation using input data from a control target device and the time taken to output a command value as a computational result to a motor.

The technique described in Patent Literature 1 may allow execution of a control program for controlling a plurality of motors in a shorter cycle by dividing the control program into a short-cycle motion program and a long-cycle motion program.

However, a control program that is allowed to take a relatively long cycle before outputting control command values to motors may be synchronized with a control program that outputs control command values to motors in a short cycle.

With the technique described in Patent Literature 1, the short-cycle motion program and the long-cycle motion program yield command values for motors that are independent of each other. In other words, when the short-cycle motion program and the long-cycle motion program are executed, these programs do not share control command values for the motors or control data associated with the current states of the motors.

Obtaining information about the timing at which each control program is executed and the timing at which the values referred to by each control program are updated, and setting such transmission and reception of data between multiple control programs will increase the burden on the user.

One or more aspects of the present invention are directed to a controller that allows easy synchronization between a plurality of control programs that are executed in parallel to control a plurality of motors.

Solution to Problem

One aspect of the present invention provides a controller for controlling a target by repeatedly executing a plurality of control programs in predetermined cycles. The controller includes a multi-core processor, and a memory configured to store the plurality of control programs, a system program, and a scheduler program. The plurality of control programs include a first control program and a second control program. The first control program includes a first motion computing program configured to compute a control command value for a motor. The first control program is cyclically executed in a first execution cycle. The second control program includes a second motion computing program configured to compute a control command value for the motor. The second control program is cyclically executed in a second execution cycle. The scheduler program includes an instruction for causing the multi-core processor to execute the first control program and the second control program in parallel. The system program includes an instruction for causing a variable associated with control of the motor used in computation by the first control program to be stored into a buffer memory for the second control program when execution of the first control program is complete, and an instruction that is read from the buffer memory for the second control program and is copied into a work area of the control program at timing to start execution of the second control program. The control programs transmit and receive data therebetween at predetermined timing relative to the execution cycle of each control program.

Advantageous Effects

The controller according to one or more embodiments of the present invention allows easy synchronization between a plurality of control programs that are executed in parallel to control a plurality of motors.

BRIEF DESCRIPTION OF THE DRAWINGS

FIG. 6 is a diagram describing a screen for setting control programs.

FIG. 8 is a graphical view showing assigning of programs to control programs.

FIG. 9 is a diagram showing an example case in which a control program 1 and a control program 2 are executed in constant cycles by a plurality of cores.

FIG. 10 is a diagram describing timing when an axis variable is to be transmitted and received.

DETAILED DESCRIPTION

System Configuration

A controller according to one or more embodiments of the present invention controls a control target, such as a machine or a device. The controller according to the present embodiment includes a central processing unit (CPU) module. The CPU module includes a microprocessor, a storage unit including a main memory for the microprocessor, and a communication circuit. The CPU module included in the controller according to the present embodiment controls a control target by repeating the operations of transmitting output data, receiving input data, and executing a control program for generating output data using input data.

The storage unit stores control programs, and a system program for controlling execution of the control programs and input and output of the input data and the output data. The microprocessor executes the system program and the control programs stored in the storage unit.

The communication circuit transmits output data and receives input data. As described below, the controller according to the present embodiment includes, as the communication circuit, a first communication circuit, which transmits output data and receives input data via a controller system bus, and a second communication circuit, which transmits output data and receives input data via a field network.

Figure 1:
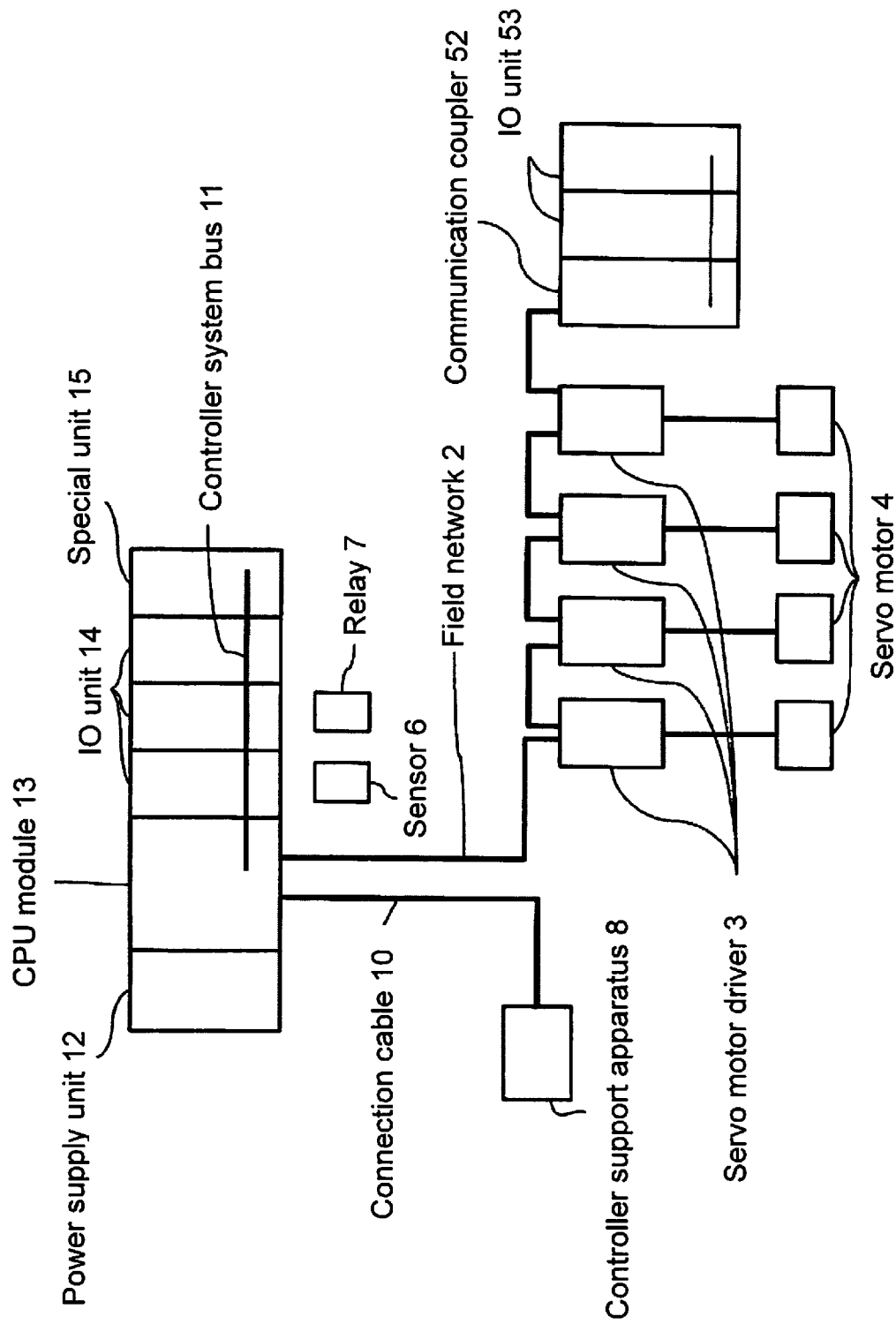
FIG. 1 is a schematic block diagram showing the configuration of a controller system according to one embodiment of the present invention.

The system configuration of a controller 1 according to the present embodiment will now be described with reference to FIG. 1. FIG. 1 is a schematic block diagram showing the schematic configuration of a controller system according to the present embodiment. Referring to FIG. 1, a controller system SYS includes the controller 1, servo motor drivers 3 and a remote IO terminal 5, which are connected to the controller 1 via a field network 2, and a sensor 6 and a relay 7, which are field devices. The controller 1 is also connected to a controller support apparatus 8 with, for example, a connection cable 10.

The controller 1 includes a CPU module 13, which performs main computation, one or more IO units 14, and a special unit 15. These units can transmit and receive data between them via a controller system bus 11. These units receive an appropriate voltage provided from a power supply unit 12. The units included in the controller 1 are provided from the manufacturer of the controller. The controller system bus 11 may thus be uniquely developed and used by the controller manufacturer. In contrast, the field network 2 (described later) may typically comply with the standards available to the public to allow products from different manufacturers to be connected to the network.

Figure 2:
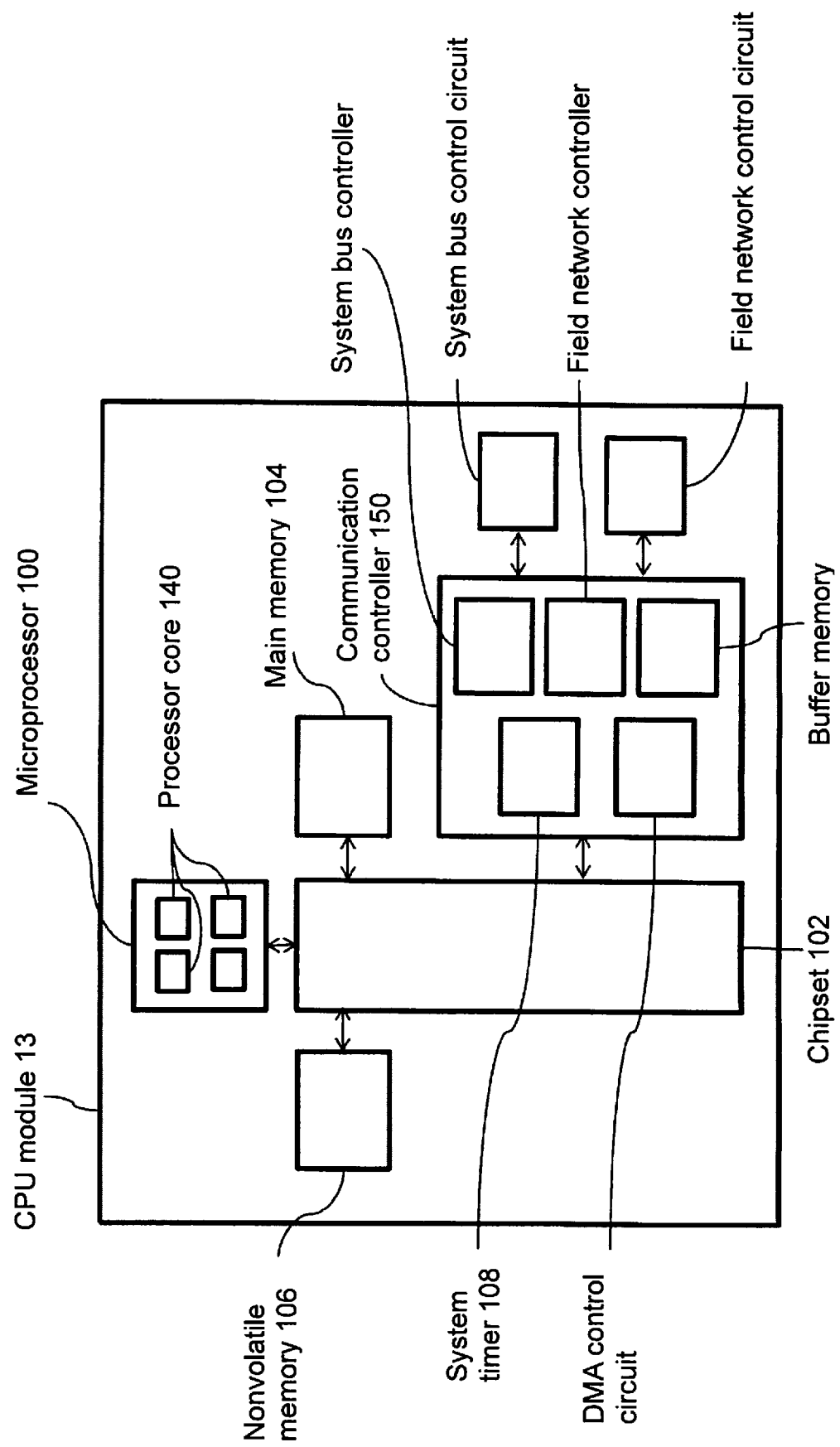
FIG. 2 shows the hardware configuration of a CPU.

The CPU module 13 will be described in detail later with reference to FIG. 2. The IO unit 14 performs typical input and output processing. The IO unit 14 receives or outputs binary data, such as data with the on or off state. More specifically, the IO unit 14 obtains information indicating whether a sensor, such as the sensor 6, has detected an object (on-state) or has detected no object (off-state). The IO unit 14 also transmits an activation command (on) or a deactivation command (off) to a designated unit, such as the relay 7 or an actuator.

The special unit 15 has functions that are not supported by the IO unit 14, such as input and output of analogue data, temperature control, and communication with a specific communication scheme.

The field network 2 can carry various data, which is transmitted to and received from the CPU module 13. The field network 2 may be industrial Ethernet (registered trademark). Variants of industrial Ethernet (registered trademark) include EtherCAT (registered trademark), Profinet IRT, MECHATROLINK (registered trademark)-III, Powerlink, SERCOS (registered trademark)-III, and CIP Motion. Any of these field networks may be used. The field network 2 may be any field network other than industrial Ethernet (registered trademark). For example, the field network 2 may be DeviceNet or CompoNet/IP (registered trademark) when motion control is not performed. The controller system SYS according to the present embodiment typically uses EtherCAT (registered trademark), which is industrial Ethernet (registered trademark), as the field network 2.

The CPU module 13 in the controller 1 may also function as the IO unit 14 or as the servo motor drivers 3. In this case, the CPU module 13 may directly control a target using its internal functions, without using the IO unit 14 or the servo motor drivers 3.

The servo motor drivers 3 are connected to the CPU module 13 via the field network 2. Each servo motor driver 3 drives a servo motor 4 in accordance with a command value provided from the CPU module 13. More specifically, each servo motor driver 3 receives command values including a position command value, a speed command value, and a torque command value from the controller 1 in constant cycles. The servo motor driver 3 also receives measured values associated with the operation of the servo motor 4, including the measured values indicating the position, the speed (typically calculated from a difference between the current position and the previous position), and the torque, from sensors including a position sensor (rotary encoder) and a torque sensor, which are connected to the shaft of each servo motor 4. Each servo motor driver 3 then sets the command values received from the CPU module 13 as target values, and sets the measured values as feedback values, and performs feedback control using the set values. In other words, the servo motor driver 3 controls the electric current for driving the servo motor 4 to allow the measured values to approach the target values. The servo motor driver 3 may also be referred to as a servo motor amplifier.

Although FIG. 1 shows the system combining the servo motors 4 and the servo motor drivers 3, the system may have another structure combining, for example, pulse motors and pulse motor drivers.

The controller system SYS shown in FIG. 1 further includes the remote IO terminal 5 connected to the field network 2. The remote IO terminal 5 basically performs typical input and output processing in the same manner as the IO unit 14. More specifically, the remote IO terminal 5 includes a communication coupler 52 for performing processing associated with data transfer via the field network 2, and one or more IO units 53. These units can transmit and receive data between them via a remote IO terminal bus 51.

The controller support apparatus 8 will be described later.

Hardware Configuration of CPU Module

The hardware configuration of the CPU module 13 will now be described with reference to FIG. 2. FIG. 2 is a schematic block diagram showing the hardware configuration of the CPU module 13 according to the embodiment of the present invention. As shown in FIG. 2, the CPU module 13 includes a microprocessor 100, processor cores 140 included in the microprocessor 100, a chipset 102, a main memory 104, a nonvolatile memory 106, a system timer 108, a communication controller 150, a system bus controller 120, a field network controller 140, and a USB connector (not shown). The chipset 102 is connected to other components with the corresponding buses.

The microprocessor 100 and the chipset 102 typically comply with the general-purpose computer architecture. More specifically, the microprocessor 100 interprets and executes instruction codes that are sequentially provided from the chipset 102 in accordance with the internal clock. The chipset 102 transmits and receives internal data to and from the components connected to the chipset 102, and generates instruction codes intended for the microprocessor 100. The chipset 102 further cashes data resulting from computation executed by the microprocessor 100.

The CPU module 13 includes the main memory 104 and the nonvolatile memory 106 as its storage units.

The main memory 104 is a volatile storage area, which is a random-access memory (RAM). The main memory 104 stores programs to be executed by the microprocessor 100 after the CPU module 13 is powered on. The main memory 104 is also used as a work memory when the microprocessor 100 executes programs. The main memory 104 may be, for example, a dynamic random access memory (DRAM) or a static random access memory (SRAM).

The nonvolatile memory 106 stores a real time operating system (OS), a system program for the controller 1, a user program, and a motion computing program, and data such as system setting parameters in a nonvolatile manner. These programs and data are copied into the main memory 104 when necessary to allow the microprocessor 100 to access such programs and data. The nonvolatile memory 106 may be a semiconductor memory such as a flash memory, or may be a magnetic recording medium such as a hard disk drive, or may be an optical recording medium such as a digital versatile disk random access memory (DVD-RAM).

The communication controller is typically implemented using hardware such as a field-programmable gate array (FPGA) or an application specific integrated circuit (ASIC). The communication controller can transmit and receive data to and from the main memory through the chipset. The communication controller includes a memory area used for data communication with the main memory. The communication controller transfers data that has been transferred from the main memory to a system bus controller or a field network controller (described later). The communication controller also generates an instruction to transmit data transferred from the main memory, and transmits the generated instruction to the system bus controller and the field network controller.

The communication controller further includes a system timer 108. The system timer 108 generates an interrupt signal and transmits the signal to the microprocessor 100 in constant cycles. Although the system timer 108 is typically designed to generate interrupt signals in multiple different cycles depending on the hardware specifications, the system timer 108 may generate interrupt signals in a selected cycle using, for example, an operating system (OS) or a basic input output system (BIOS). The interrupt signals generated by the system timer 108 are to be used to perform the control operations for each control cycle (described later).

The system bus controller 120 and the field network controller 140 serve as communication circuits. These communication circuits transmit output data and receive input data.

When the CPU module 13 functions as the IO unit 14 or the servo motor driver 3, the CPU module 13 has the corresponding internal functions of transmitting the output data and receiving the input data, which replace the transmission and reception functions of the system bus controller 120.

The communication controller 150 controls data communication via the controller system bus 11. More specifically, the communication controller 150 includes the system bus controller 120, a dynamic memory access (DMA) control circuit 122, and a buffer 126.

The buffer 126 functions as a transmission buffer for transmitting data to be output to other units via the controller system bus 11 (hereafter referred to as output data or first output data), and functions as a reception buffer for receiving data input from other units via the controller system bus 11 (hereafter referred to as input data or first input data). The first output data resulting from the computation performed by the microprocessor 100 is first stored into the main memory 104. The first output data to be transferred to a specific unit is read from the main memory 104, and is then stored temporarily into the buffer 126. The first input data transferred from another unit is temporarily stored into the buffer 126, and is then transferred to the main memory 104.

The DMA control circuit 122 transfers the first output data from the main memory 104 to the buffer 126, and transfers the first input data from the buffer 126 to the main memory 104.

The communication controller transmits the first output data stored in the buffer 126 to another unit that is connected to the controller system bus 11, and also stores the first input data received from the unit into the buffer 126. The system bus communication controller typically functions as a physical layer and a data link layer in the controller system bus 11.

The field network controller 140 controls data communication via the field network 2. More specifically, the field network controller 140 controls transmission of output data and reception of input data in accordance with the standards of the field network 2. As described above, the field network 2 according to the present embodiment complies with EtherCAT (registered trademark). The field network controller 140 thus includes hardware for performing common Ethernet (registered trademark) communication. Under EtherCAT (registered trademark), a common Ethernet (registered trademark) controller with a communication protocol complying with the common Ethernet (registered trademark) standards may be used. When a particular variant of industrial Ethernet (registered trademark) is used as the field network 2, a special Ethernet (registered trademark) controller that complies with a dedicated communication protocol different from the common communication protocol may be used. When a field network other than industrial Ethernet (registered trademark) is used, a field network controller that complies with the corresponding standards is to be used.

A buffer functions as a transmission buffer for transmitting data output to other devices via the field network 2 (hereafter also referred to as output data or second output data), and functions as a reception buffer for receiving data input from other devices via the field network 2 (hereafter also referred to as input data or second input data). The second output data resulting from the computation performed by the microprocessor 100 is first stored into the main memory 104. The second output data to be transferred to a specific device is read from the main memory 104, and then is stored temporarily into the second communication circuit buffer 146. The second input data transferred from other devices is stored temporarily into the buffer 146, and is then transferred to the main memory 104.

The DMA control circuit 142 transfers the second output data from the main memory 104 to the buffer, and transfers the second input data from the buffer to the main memory 104.

The field network controller 140 transmits the second output data stored in the buffer to other devices connected to the field network 2. The field network controller 140 also receives the second input data from other devices connected to the field network 2, and stores the data into the buffer in the second communication circuit. The field network controller 140 typically functions as a physical layer and a datalink layer in the field network 2.

The USB connector is an interface for connecting the controller support apparatus 8 and the CPU module 13. Through the USB connector, the controller 1 typically obtains programs executable by the microprocessor 100 included in the CPU module 13, which are transferred from the controller support apparatus 8.

Software Configuration of CPU

Software implemented to achieve various functions according to the present embodiment will now be described with reference to FIG. 3. The software includes instruction codes that are read at appropriate timing and executed by the microprocessor 100 and the processor cores 140 included in the CPU module 13.

Figure 3:
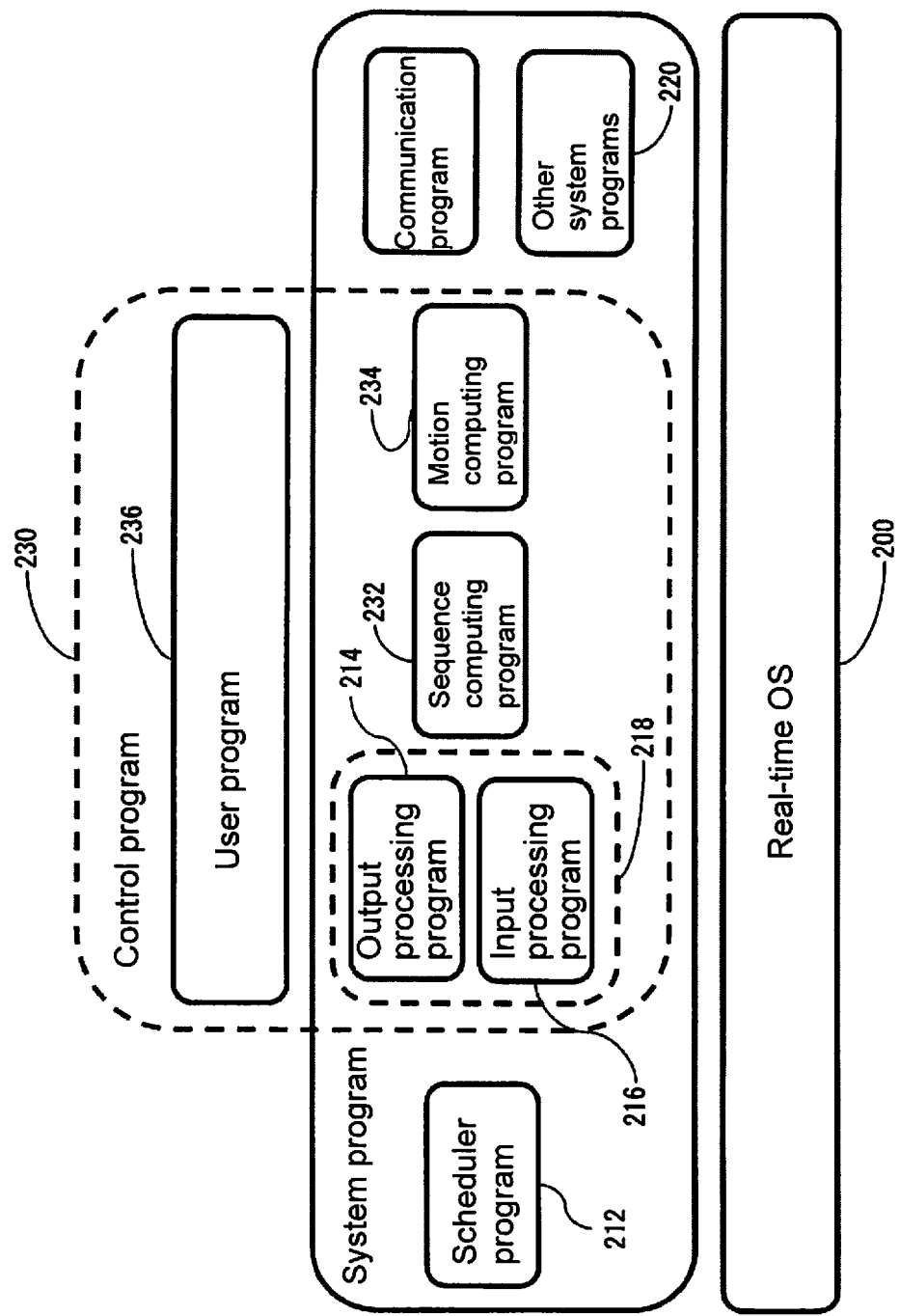
FIG. 3 is a schematic diagram showing the configuration of software implemented by the CPU according to one embodiment of the present invention.

FIG. 3 is a schematic block diagram showing the configuration of software implemented by the CPU module 13 according to the embodiment of the present invention. As shown in FIG. 3, the software executed by the CPU module 13 includes three layers, namely, a real-time OS 200, a system program 210, and a user program 236.

The real-time OS 200 is designed in accordance with the computer architecture of the CPU module 13. The real-time OS 200 provides a basic environment in which the microprocessor 100 executes the system program 210 and the user program 236.

The system program 210 is software for enabling the capabilities of the controller 1. More specifically, the system program 210 includes a scheduler program 212, an output processing program 214, an input processing program 216, a sequence instruction computing program 232, a motion computing program 234, and other system programs 220. The output processing program 214 and the input processing program 216, which are normally executed successively (or integrally), may be collectively referred to as an IO processing program 218.

The user program 236 is generated in accordance with the user's control purpose. In other words, the user program 236 can be designed freely using the controller system SYS in accordance with, for example, a target line (process) to be controlled.

As described later, the user program 236 serves the user's control purpose in cooperation with the sequence instruction computing program 232 and the motion computing program 234. In other words, the user program 236 uses instructions, functions, and functional modules provided from the sequence instruction computing program 232 and the motion computing program 234 to perform the programmed operations. The user program 236, the sequence instruction computing program 232, and the motion computing program 234 may also be collectively referred to as a control program 230.

As described above, the microprocessor 100 included in the CPU module 13 executes the system program 210 and the control program 230 stored in the storage unit.

The programs will now be described in more detail. As described above, the user program 236 is generated in accordance with the user's control purpose (e.g., a target line or process). The user program 236 is typically an object program executable by the microprocessor 100 included in the CPU module 13. The user program 236 is generated by compiling a source program written in, for example, a ladder language in the controller support apparatus 8. The generated user program 236 as an object program is then transferred from the controller support apparatus 8 to the CPU module 13 via the connection cable 10, and is stored into a memory, such as the nonvolatile memory 106.

The scheduler program 212 controls the starting of processing and the resuming of suspended processing in each execution cycle of the output processing program 214, the input processing program 216, and the control programs 230. More specifically, the scheduler program 212 controls the execution of the user program 236 and the motion computing program 234.

The CPU module 13 according to the present embodiment uses constant execution cycles (control cycles) suited to the motion computing program 234 as common cycles for the entire processing. The entire processing cannot be complete within one control cycle. Thus, the processing is divided into a plurality of processing portions, which are then categorized as either a processing portion to be completed in one control cycle or a processing portion that may be executed over a plurality of control cycles based on the priority of each processing portion to be executed. The scheduler program 212 manages the execution order of such processing portions. Within each control cycle time, the scheduler program 212 executes a program with a higher priority at earlier timing.

The output processing program 214 reconfigures the output data generated when the user program 236 (control program 230) is executed into a format suitable for being transferred to the communication controller. When the system bus controller 120 or the field network controller 140 uses a transmission instruction from the microprocessor 100, the output processing program 214 generates the transmission instruction.

The input processing program 216 reconfigures the input data received by the system bus controller 120 and/or the field network controller 140 into a format suitable for use by the control program 230.

The sequence instruction computing program 232 is called when a certain sequence instruction used in the user program 236 is executed. The sequence information computing program 232 is executed to enable the processing corresponding to the instruction.

The motion computing program 234 is executed in accordance with an instruction provided from the user program 236 to compute a command value to be output to a motor driver, such as the servo motor driver 3 and a pulse motor driver.

The other system programs 220 are a group of programs that enable the various capabilities of the controller 1, other than the programs shown individually in FIG. 3. The other system programs 220 include, for example, programs enabling the microprocessor to implement communication with controllers of machines, processing in response to requests from external devices, and self-diagnostic processing. The system programs 220 further include programs enabling transfer of data from the main memory to external storage media or readout of data from external storage media.

The real-time OS 200 provides an environment in which a plurality of programs are switched with time and are executed. In the initial setting, the controller 1 according to the present embodiment includes an interrupt to start a control cycle, which is an event (interrupt) for outputting (transmitting) output data resulting from execution of a program by the CPU module 13 to another unit or device. When an interrupt to start a control cycle occurs, the real-time OS 200 switches the execution target of the microprocessor 100 from the program being executed during the interrupt to the scheduler program 212. The real-time OS 200 executes a program included in the system program 210 when neither the scheduler program 212 nor a program controlled by the scheduler program 212 is executed. For example, the real-time OS 200 may execute a program associated with communication between the CPU module 13 and the controller support apparatus 8 via the connector cable 10 (USB).

The control programs 230 and the scheduler program 212 are stored into the main memory 104 and the nonvolatile memory 106, which are the storage units.

Hardware Configuration of Support Apparatus

The controller support apparatus 8 for generating programs to be executed by the controller 1 or performing maintenance of the controller 1 will now be described.

Figure 4:
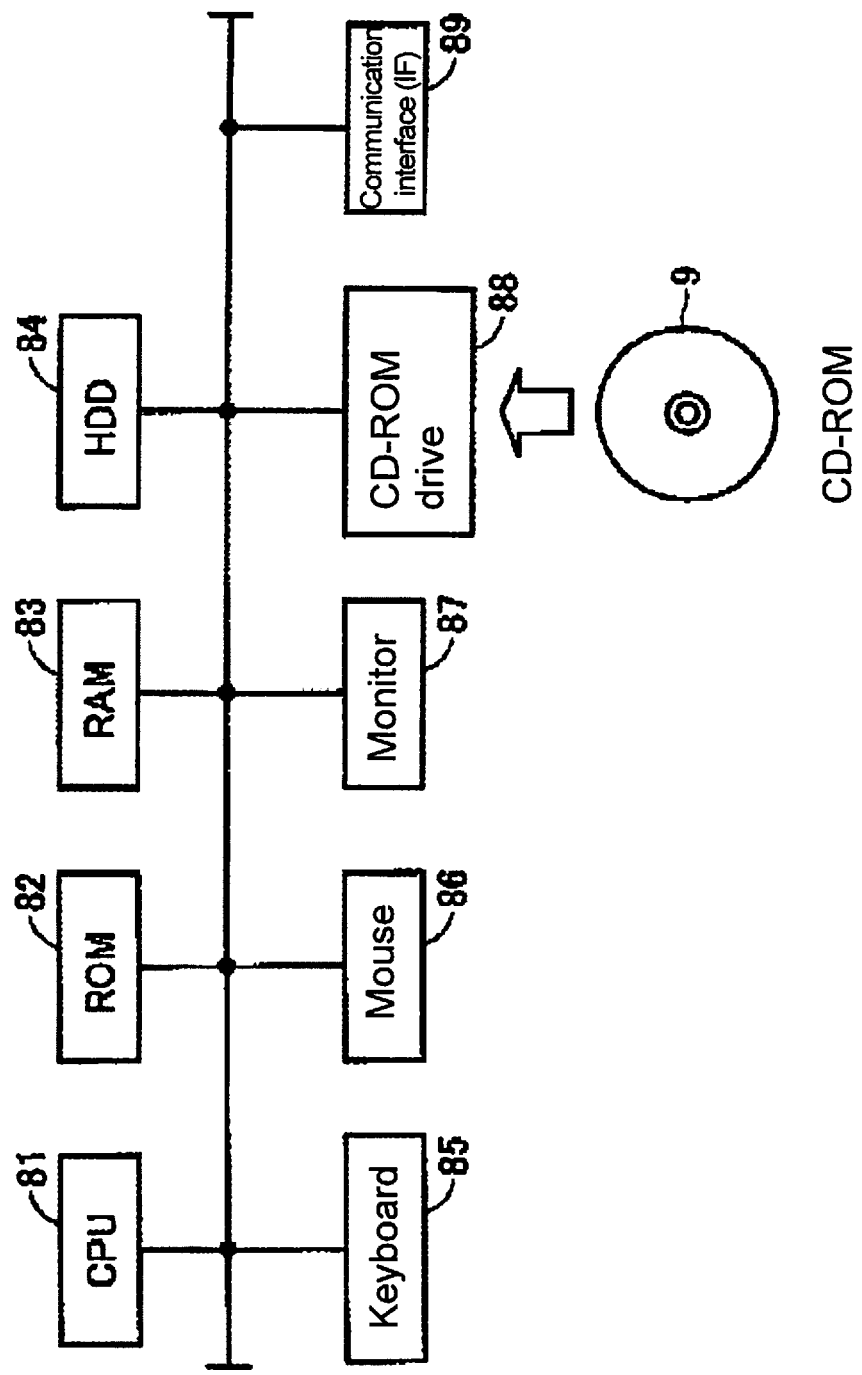
FIG. 4 is a schematic diagram showing the hardware configuration of the controller according to one embodiment of the present invention.

FIG. 4 is a schematic block diagram showing the hardware configuration of the controller support apparatus 8 according to the present embodiment. Referring to FIG. 4, the controller support apparatus 8 is typically a general-purpose computer. For ease of maintenance, the controller support apparatus 8 may be a notebook computer that can be carried easily.

As shown in FIG. 4, the controller support apparatus 8 includes a CPU 81, which executes various programs including an operating system (OS), a read-only memory (ROM) 82, which stores the BIOS or other data, a memory RAM 83, which provides a work area for storing data used for the CPU 81 in executing programs, and a hard disk (HDD) 84, which stores programs to be executed by the CPU 81 in a nonvolatile manner. The CPU 81 corresponds to the computing unit of the controller support apparatus 8. The ROM 82, the RAM 83, and the hard disk 84 correspond to the storage unit of the controller support apparatus 8.

The controller support apparatus 8 further includes a keyboard 85 and a mouse 86, which receive an operation performed by the user, and a monitor 87, which displays information to the user. The controller support apparatus 8 further includes a communication interface (IF) 89, which allows communication with, for example, the controller 1 (CPU module 13).

As described later, the programs executed by the controller support apparatus 8 are stored in a compact disk read-only memory (CD-ROM) 9 and are distributed. The programs stored in the CD-ROM 9 are read by a CD-ROM drive 88 and then stored in, for example, the hard disk 84. The programs may also be downloaded from an upper host computer via a network.

Control Program

In the present embodiment, the control programs serve as execution units for a series of operations including operations caused by an IO processing program and a user program, as well as by a sequence computing program and a motion computing program that are executed in combination with the user program.

To generate programs that are executed in parallel, the user considers various timing requirements such as the start and end timing or the timing to copy data. This increases the burden on the user.

In the present embodiment, the execution cycles and the execution priority are set for each control program, and the execution start timing as well as the limiting conditions are set for each control program to allow each program to be executed in a shorter cycle. The different control programs executed by the controller are shown in the figure. The scheduler program causes the microprocessor to execute each control program in accordance with its execution priority as well as its execution cycle.

A control program 1 has the highest priority. The control program 1 executes an output processing program 1 to generate output data and an input processing program 1 to obtain input data, and executes a user program 1 assigned to this control program, executes a motion computing program 1, and calculates a command value to be output to a motor. The control program 1 causes this series of operations to be executed in the stated order.

A control program 2 has the second highest priority after the control program 1. The control program 2 executes an output processing program 2 to generate output data and an input processing program 2 to obtain input data, and executes a user program 2 assigned to this control program, and executes a motion computing program 2. The control program 2 causes this series of operations to be executed in the stated order.

A control program 3 is executed in constant cycles. The control program 3 uses the output data and the input data obtained by the control program 1. More specifically, the control program 3 receives the input data resulting from the IO refresh performed by the control program 1, and generates output data in every predetermined cycle.

The control program 3 allows a program that may take a relatively long execution cycle to be assigned. Assigning such a program included in the control program 1 to the control program 3 will shorten the execution cycle of the control program 1. A control program 4, which includes only user programs, is used for processing unrelated to high-speed control computing, and is used for programming communication or backup processing.

Figure 5:
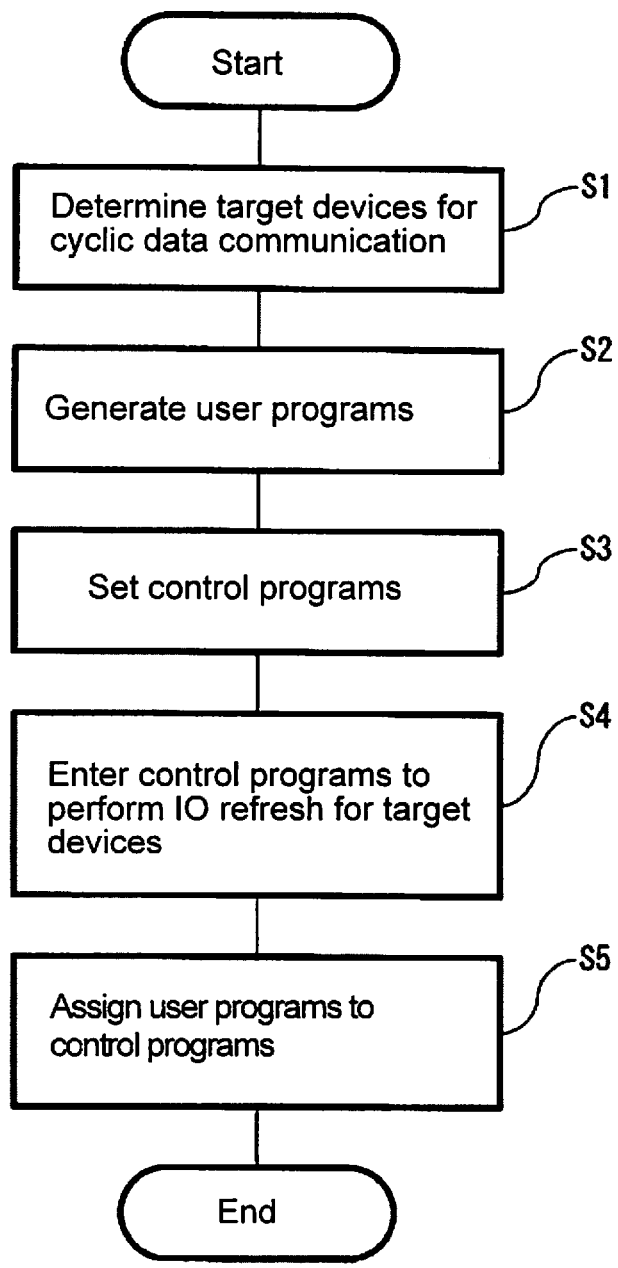
FIG. 5 is a flowchart showing a procedure for settings performed in the controller.

A procedure of programming performed by the controller using the controller support apparatus will now be described. FIG. 5 is a flowchart showing a procedure for settings performed in the controller.

In step S1, target devices to be connected to the field network or to the system bus are designated. More specifically, information to enable communication with the target devices that have been connected to the field network or the system bus is set. Although not shown, communication may be performed with devices that have been connected to the field network or the system bus to automatically obtain information about the connected devices or about the connection topology of these devices.

In step S2, the user generates user programs in the manner described above in accordance with its control purpose by using the controller support apparatus. Using data received from each target device connected to the field network or the system bus designated in step S1, the user generates a program that causes execution of sequence computation and motion computation and generates output data. The user may generate a user program divided in a plurality of program modules.

In step S3, the user sets control programs. The user sets the execution cycles of these control programs in accordance with the control purpose.

In step S4, the user enters control programs for which IO refresh is to be performed for the target devices connected to the network designated in step S1. FIG. 6 is a diagram showing a screen for setting the control programs. The user enters a control program for which IO refresh is to be performed for each target device connected to the field network or to the system bus. The screen lists the target devices together with their unit names. For each target device, the user selects a control program for which IO refresh is to be performed using the pulldown menu.

Figure 7:
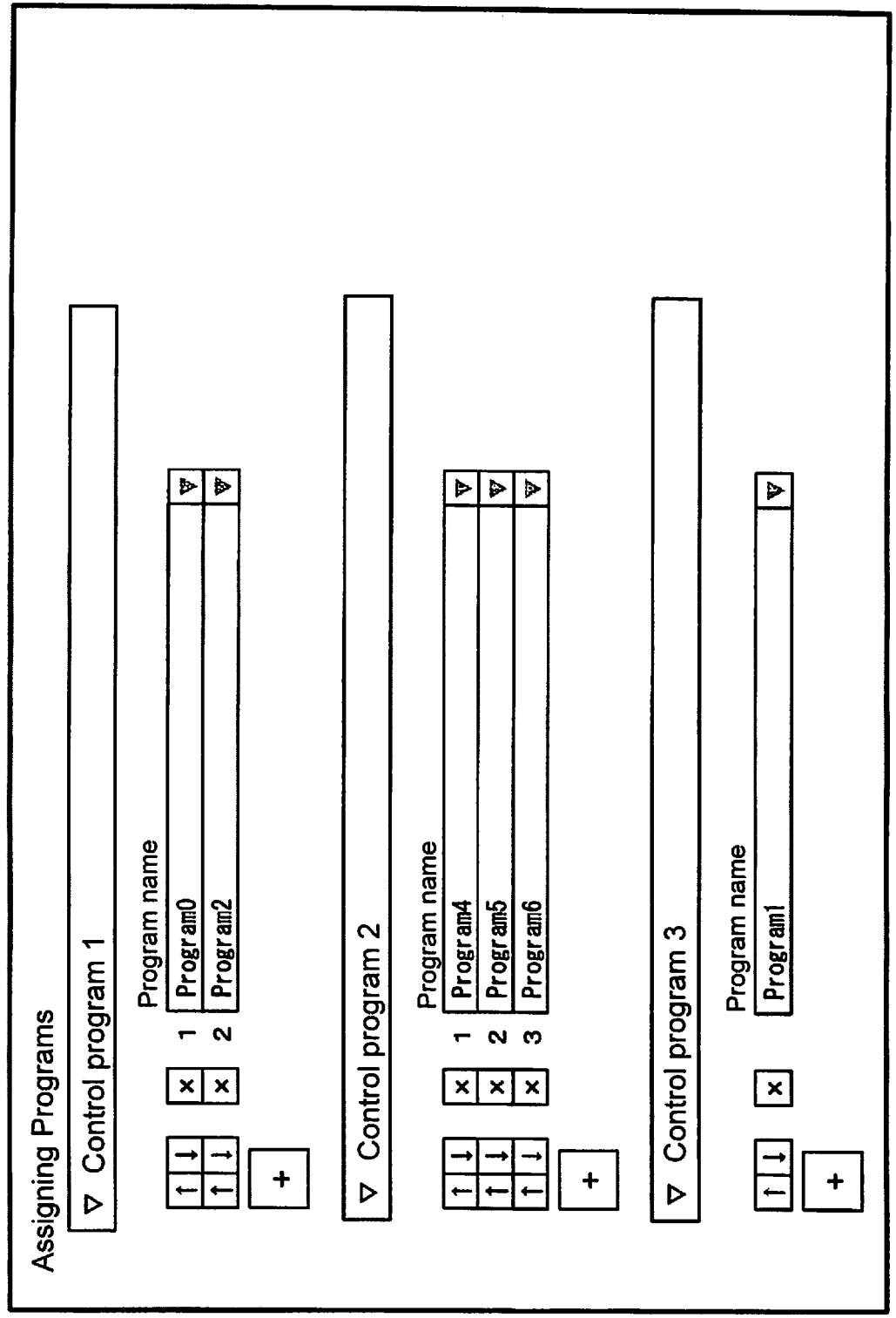
FIG. 7 is a diagram describing a screen for assigning programs.

In step S5, the user assigns the generated user programs to the control programs. FIG. 7 is a graphical view showing assigning of the user programs to the control programs. In FIG. 7, the generated user programs (Programs 0 to 6) are assigned to the control programs. When assigning a plurality of user programs to one control program, the user sets the execution order for these user programs. In the example shown in FIG. 7, the user programs Program 0 and Program 2 are assigned to the control program 1. The user programs that are Program 4, Program 5, and Program 6 are assigned to the control program 2. Program 1 is assigned to the control program 3.

With the procedure described above, the user generates control programs, each of which includes information about the execution cycle, the setting parameters indicating the devices to transmit and receive data under the IO control program included in the control program, and the user program(s) to be executed. The scheduler program included in the controller refers to the setting parameters that have been transferred, refers to the execution cycle of the control program, and controls the timing to start or end the program execution.

In the present embodiment, the control programs are executed in execution cycles in which communication (IO refresh) with the external devices connected to the field network or the system bus. The communication program thus sets the communication cycles and designates target devices to undergo IO refresh in the set communication cycles based on the setting parameters.

Referring now to FIG. 8, an example case in which motors are controlled using a plurality of control programs including motion computing programs will be described. The physical configuration shown in FIG. 8 includes an axis 1 (motor 1, hereafter also referred to as the axis 1), an axis 2 (motor 2, hereafter also referred to as the axis 2), and an axis 3 (motor 3, hereafter also referred to as the axis 3). When the axes 1, 2, and 3 are controlled in synchronization, a command value or a feedback value from the axis 1 is referred to in computing command values for the axes 2 and 3, which are controlled using the computed command values. For example, the command values for the axes 2 and 3 are provided at a predetermined ratio to the rotation of the axis 1 to achieve the intended gear operation of the axis 1. In other words, the current value of the axis 1, which is the master axis or the feedback value from a slave axis is referred to, and the control command values are provided to the axes 2 and 3, which are the slave axes.

In the example described below, control programs including a plurality of motion computing programs are executed to achieve a gear operation using the axis 1 as a master axis and the axes 2 and 3 as slave axes. The control program 1 is executed to obtain the values of variables associated with the axes 1 and 2 by executing an IO control program in the manner described below. In accordance with an instruction from the motion computing program 1, the obtained input data is referred to, and a command value for the axis 2 is computed and is output based on the current value of the axis 1 or the command value. This achieves the gear operation using the axes 1 and 2.

The control program 2 receives a parameter indicating the state of the axis 1 transferred from the control program 1, and outputs the parameter as a command value to the axis 4, which is a virtual axis in the controller, and executes the command value for the axis 3 using the axis 4 as a master axis.

The above structure allows the function variables to be transmitted and received by the axes between the control programs. This enables synchronization between the axis 1, which is controlled by the control program 1, and the axis 3, which is controlled by the control program 2.

First Embodiment

FIG. 9 is a diagram showing an example case in which the control program 1 and the control program 2 are executed in constant cycles by a plurality of cores. Each of the control program 1 and the control program 2 includes an IO processing program 1, an IO processing program 2, a user program 1, a user program 2, a motion computing program 1, and a motion computing program 2.

The timing to start execution of the control program 1 and the control program 2 using a multi-core processor will now be described. FIG. 9 is a diagram showing the execution timing for the control program 1. The scheduler program starts execution of the control program 1 and the control program 2 when detecting that a predetermined time comes.

In the figure, IO in the control program 1 indicates an operation performed in accordance with an instruction from the IO control program. A processor core 1 transmits output data and receives input data in accordance with an instruction from the IO control program 1. More specifically, the microprocessor core 1 transfers output data 1 for an external device associated with the control program 1 from the communication buffer in the main memory to the buffer memory in the communication controller 150 in accordance with an instruction from the output processing program included in the IO control program 1. The microprocessor core 1 also transfers input data 1 that has been transferred from the communication controller and stored in the communication buffer to a work area for the user program 1 in accordance with an instruction from the input processing program.

In the figure, UPG in the control program 1 indicates an operation performed in accordance with an instruction from the user program 1. In accordance with an instruction from the user program 1, the microprocessor core 1 performs sequence computing using the input data stored in the work area for the user program 1, and stores output data into the communication buffer and also into an area for computation used by the motion computing program 1.

In the figure, MC in the control program 1 indicates an operation performed in accordance with an instruction from the motion computing program 1. The microprocessor core 1 computes a command value for a motor for the execution cycle of the control program 1, performs computation to obtain output data, and stores the output data into a buffer from which the output data is to be transferred to the communication controller.

The operation of the control program 2 will now be described. In the figure, IO in the control program 2 indicates an operation performed in accordance with an instruction from the IO control program 2. The processor core 2 transmits output data and receives input data in accordance with an instruction from the IO control program 2.

More specifically, the microprocessor core 2 transfers output data for an external device associated with the control program 2 from the communication buffer in the main memory to the buffer memory in the communication controller 150 in accordance with an instruction from the output processing program 2 included in the IO control program 2. The microprocessor core 2 also transfers input data that has been transferred from the communication controller and stored in the communication buffer to a work area for the user program 2 in accordance with an instruction from the input processing program 2.

In the figure, UPG in the control program 2 indicates an operation performed in accordance with an instruction from the user program 2. In accordance with an instruction from the user program 2, the microprocessor core 2 performs sequence computing using the input data stored in the work area for the user program 2, and stores output data into the communication buffer and also into an area for computation used by the motion computing program 2.

In the figure, MC in the control program 2 indicates an operation performed in accordance with an instruction from the motion computing program 2. The microprocessor core 2 computes a command value for a motor for the execution cycle of the control program 2, performs computation to obtain output data, and stores the output data into a buffer from which the output data is to be transferred to the communication controller.

The IO control program 2, the user program 2, and the motion computing program 2 included in the control program 2 are executed cyclically.

Transmitting and Receiving Data Between Control Programs

To allow transmission or reception of data between control programs, an axis variable transfer instruction is to be written in a control program. The axis variable transfer instruction defines an axis variable to be received from another control program. In this example, an axis variable transfer instruction is written in the control program 2.

In the example shown in FIG. 9, the axis variable transfer instruction is activated in accordance with an instruction from the user program 2 included in the control program 2.

When the axis variable transfer instruction is activated, the system program copies a variable defined by the axis variable transfer instruction to the buffer area for the control program 2 after the execution of the control program 1 completes in the cycle immediately before the cycle in which the two control programs are started at the same timing.

In the example shown in FIG. 9, the control program 2 is executed in parallel with the control program 1 in the execution cycle that is three times longer than the execution cycle of the control program 1. In this case, the control program 1 is executed at the same timing as the control program 2 once every three execution cycles of the control program 1. As indicated by the arrows in the figure, the axis variable defined by the axis variable transfer instruction is copied into the buffer area for the control program 2 after the execution of the control program 1 completes.

FIG. 10 is a diagram showing the timing when an axis variable is to be transmitted and received. In the figure, IO, UPG, and MC indicate the same operations as described with reference to FIG. 9, and are not described. As indicated by letter A in the figure, an axis variable in the control program 1 executed in the cycle immediately before the cycle in which the control program 1 and the control program 2 are started at the same timing is transmitted to the control program 2. As indicated by letter B in the figure, although the user program 2 included in the control program 2 is started after the execution of the control program 1 completes, the axis variable is not transmitted.

In this manner, an axis variable in the cycle immediately before the control cycle in which the control programs are started at the same timing is transferred. This enables computation to be performed in predetermined cycles independently of the execution status of the control program 1 and the control program 2.

REFERENCE SIGNS LIST

218 IO processing program
234 motion computing program
236 user program
214 output processing program
230 control program
1 controller
8 controller support apparatus
11 controller system bus
216 input processing program
14, 53 IO UNIT
122, 142 DMA control circuit
210, 220 system program

The invention claimed is:

1. A controller for controlling a target by repeatedly executing a plurality of control programs in predetermined cycles, the controller comprising:
a multi-core processor; and
a memory configured to store the plurality of control programs, a system program, and a scheduler program, wherein
the multi-core processor is configured to execute at least some of the plurality of control programs, the system program and the scheduler program,
the plurality of control programs comprises:
a first control program comprising a first motion computing program configured to cause the multi-core processor to perform operations to compute a first control command value for a first motor, the first control program being cyclically executed in a first execution cycle, the first execution cycle being of a first length,
a second control program comprising a second motion computing program configured to cause the multi-core processor to perform operations to compute a second control command value for the first motor, the second control program being cyclically executed in a second execution cycle, the second execution cycle being of a second length different from the first length, the second control program comprising an axis variable transfer instruction that defines a first axis variable for the first control program, and
the first motion computing program comprises an instruction for causing the multi-core processor to perform operations to compute a control command value of a second motor that comprises a slave axis based on one of the first control command value or the second control command value of the first motor that comprises a master axis, or based on a feedback value from a slave axis, the scheduler program comprising an instruction for causing the multi-core processor to execute the first control program and the second control program in parallel, the system program comprising:

an instruction for causing the first axis variable defined by the axis variable transfer instruction and associated with control of the first motor used in computation by the first control program to be stored into a buffer memory for the second control program upon executing the axis variable transfer instruction when execution of the first control program completes in the first execution cycle immediately before a time at which the first execution cycle and the second execution cycle are started at the same time, and an instruction for causing the first axis variable stored in the buffer memory for the second control program to be copied into a work area of the second control program at a timing at which execution of the second control program is started, and the first and second control programs cause the multi-core processor to perform operations to transmit and receive data between the first control program and the second control program at a predetermined timing relative to the first execution cycle and the second execution cycle.

2. A controller for controlling a target by repeatedly executing a plurality of control programs in predetermined cycles, the controller comprising:

a multi-core processor; and a memory configured to store the plurality of control programs, a system program, and a scheduler program, wherein the multi-core processor is configured to execute at least some of the plurality of control programs, the system program and the scheduler program, the plurality of control programs comprises:

a first control program comprising a first motion computing program configured to cause the multi-core processor to perform operations to compute a first control command value for a first motor, the first control program being cyclically executed in a first execution cycle, the first execution cycle being of a first length, a second control program comprising a second motion computing program configured to cause the multi-core processor to perform operations to compute a second control command value for the first motor, the second control program being cyclically executed in a second execution cycle, the second execution cycle being of a second length different from the first length, the second control program comprising an axis variable transfer instruction that defines a first axis variable for the first control program, the first motion computing program comprises an instruction for causing the multi-core processor to perform operations to compute a control command value of a second motor that comprises a slave axis based on one of the first control command value or the second control command value of the first motor that comprises a master axis, or based on a feedback value from a slave axis, and the second motion computing program comprising an instruction for causing the multi-core processor to perform operations to compute a control command value of a third motor that comprises a slave axis based on one of the first control command value or the second control command value of the first motor that comprises the master axis, or based on the feedback value of the slave axis, the scheduler program comprising an instruction for causing the multi-core processor to execute the first control program and the second control program in parallel, the system program comprising:

an instruction for causing the first axis variable defined by the axis variable transfer instruction and associated with control of the first motor used in computation by the first control program to be stored into a buffer memory for the second control program upon executing the axis variable transfer instruction when execution of the first control program completes in the first execution cycle immediately before a time at which the first execution cycle and the second execution cycle are started at the same time, and an instruction for causing the first axis variable stored in the buffer memory for the second control program to be copied into a work area of the second control program at a timing at which execution of the second control program is started, and the first and second control programs cause the multi-core processor to perform operations to transmit and receive data between the first control program and the second control program at a predetermined timing relative to the first execution cycle and the second execution cycle.

3. A controller for controlling a target by repeatedly executing a plurality of control programs in predetermined cycles, the controller comprising:

a multi-core processor; and a memory configured to store the plurality of control programs, a system program, and a scheduler program, wherein the multi-core processor is configured to execute at least some of the plurality of control programs, the system program and the scheduler program, the plurality of control programs comprises:

a first control program comprising a first motion computing program configured to cause the multi-core processor to perform operations to compute a first control command value for a first motor, the first control program being cyclically executed in a first execution cycle, the first execution cycle being of a first length, and a second control program comprising a second motion computing program configured to cause the multi-core processor to perform operations to compute a second control command value for the first motor, the second control program being cyclically executed in a second execution cycle, the second execution cycle being of a second length different from the first length, the second control program comprising an axis variable transfer instruction that defines a first axis variable for the first control program, the scheduler program comprising an instruction for causing the multi-core processor to execute the first control program and the second control program in parallel, the system program comprising:

an instruction for causing the first axis variable defined by the axis variable transfer instruction and associated with control of the first motor used in computation by the first control program to be stored into a buffer memory for the second control program upon executing the axis variable transfer instruction when execution of the first control program completes in the first execution cycle immediately before a time at which the first execution cycle and the second execution cycle are started at the same time, an instruction for causing the first axis variable stored in the buffer memory for the second control program to be copied into a work area of the second control program at a timing at which execution of the second control program is started, and an instruction for causing the first axis variable to not be stored into the buffer memory for the second control program during executing the second control program, after execution of the first control program completes at a timing at which the first execution cycle and the second execution cycle are started at the same time, and the first and second control programs cause the multi-core processor to perform operations to transmit and receive data between the first control program and the second control program at a predetermined timing relative to the first execution cycle and the second execution cycle.

* * * * *